F. H. LIPPINCOTT.
VARIABLE SPEED CLUTCH.
APPLICATION FILED FEB. 28, 1918.

1,327,767.

Patented Jan. 13, 1920.
3 SHEETS—SHEET 1.

WITNESS:

INVENTOR
Fisher H. Lippincott
BY
Frank L. Busser
ATTORNEY.

F. H. LIPPINCOTT.
VARIABLE SPEED CLUTCH.
APPLICATION FILED FEB. 28, 1918.

1,327,767.

Patented Jan. 13, 1920.
3 SHEETS—SHEET 2.

WITNESS:
Robt M Kitchel

INVENTOR
Fisher H. Lippincott.
BY Frank S. Busser
ATTORNEY.

F. H. LIPPINCOTT.
VARIABLE SPEED CLUTCH.
APPLICATION FILED FEB. 28, 1918.
1,327,767.
Patented Jan. 13, 1920.
3 SHEETS—SHEET 3
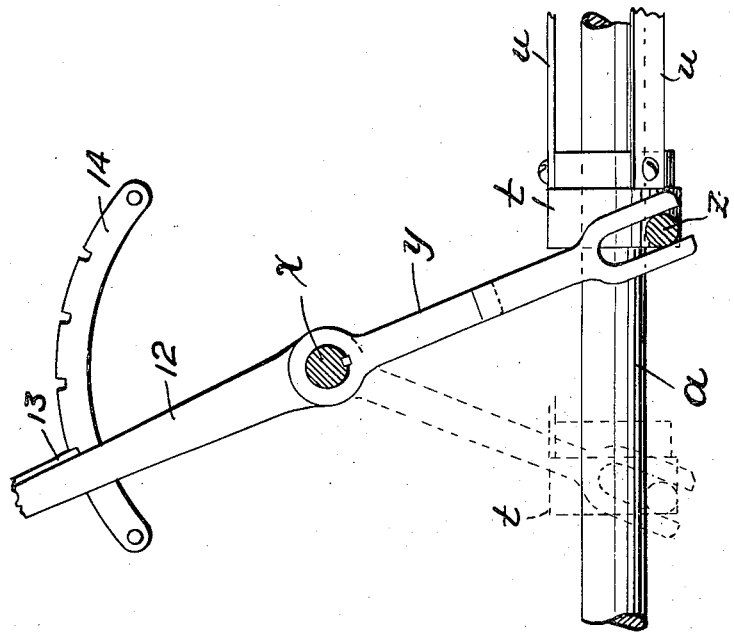
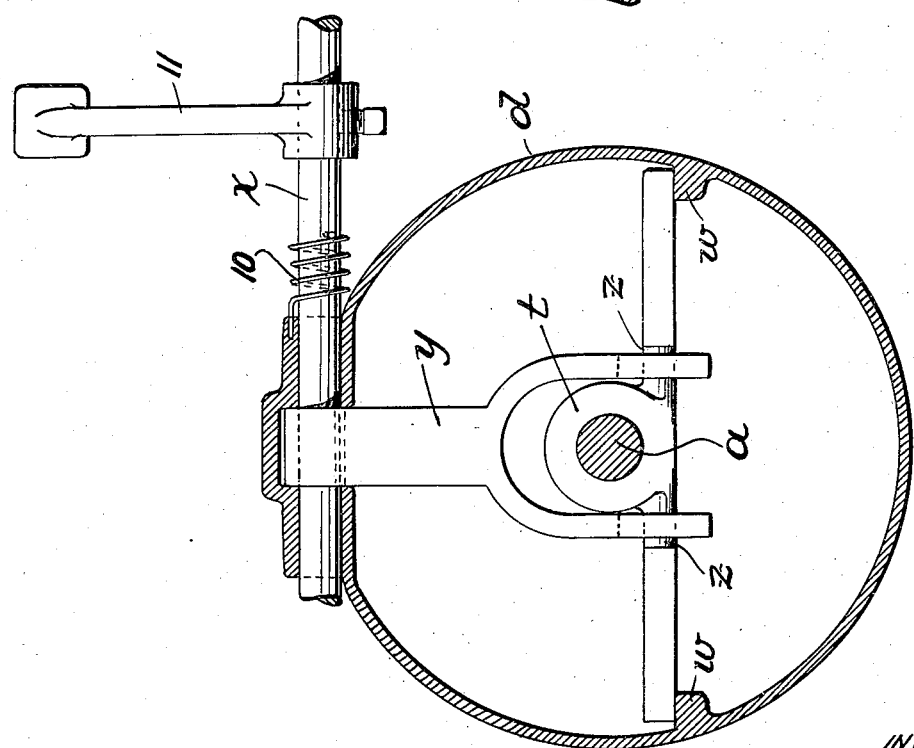
WITNESS:
INVENTOR
Fisher H. Lippincott
BY
ATTORNEY.

UNITED STATES PATENT OFFICE.

FISHER H. LIPPINCOTT, OF PHILADELPHIA, PENNSYLVANIA.

VARIABLE-SPEED CLUTCH.

1,327,767.

Specification of Letters Patent.

Patented Jan. 13, 1920.

Application filed February 28, 1918. Serial No. 219,673.

*To all whom it may concern:*

Be it known that I, FISHER H. LIPPINCOTT, a citizen of the United States, residing at Philadelphia, county of Philadelphia, and State of Pennsylvania, have invented a new and useful Improvement in Variable-Speed Clutches, of which the following is a full, clear, and exact description, reference being had to the accompanying drawings, which form a part of this specification.

The object of the invention is to provide means whereby a constantly rotating driving shaft may be placed in driving relation with the shaft to be driven by means of a friction drive which will allow slippage between the frictionally engaging elements of the drive during the application of the drive until the driven shaft has picked up its speed and which, in the event of a sudden increase of load, will allow slippage between said friction elements until the load is relieved or the speed of the driving shaft increased to take care of the increased load.

The invention is especially applicable to gas-driven automobiles, especially where it is designed, as in the ordinary automobile, to normally maintain the high speed relation between the engine and the driven axle and to normally govern the power and speed by engine throttling. Its application to gas-driven automobiles dispenses with the necessity of mechanical speed-change gears, its action being wholly automatic, or partly automatic and partly normally controlled, when, due to an increase of load, it becomes necessary to reduce the speed relation between the power and the driven axle. It also allows the driven shaft, in starting, to pick up its speed gradually. It also gives a finer and more flexible adjustment than can be obtained by the use of mechanical gear shifting mechanism. A preferred embodiment of the invention is shown in the accompanying drawings, in which—

Fig. 4 is a cross-section on the line 4—4 of Fig. 1, showing also the manually operable means for shifting the friction drive.

Fig. 5 is a detail side view of part of the shifting means shown in Fig. 4 together with manually operable means for maintaining any given speed position.

Figure 1:
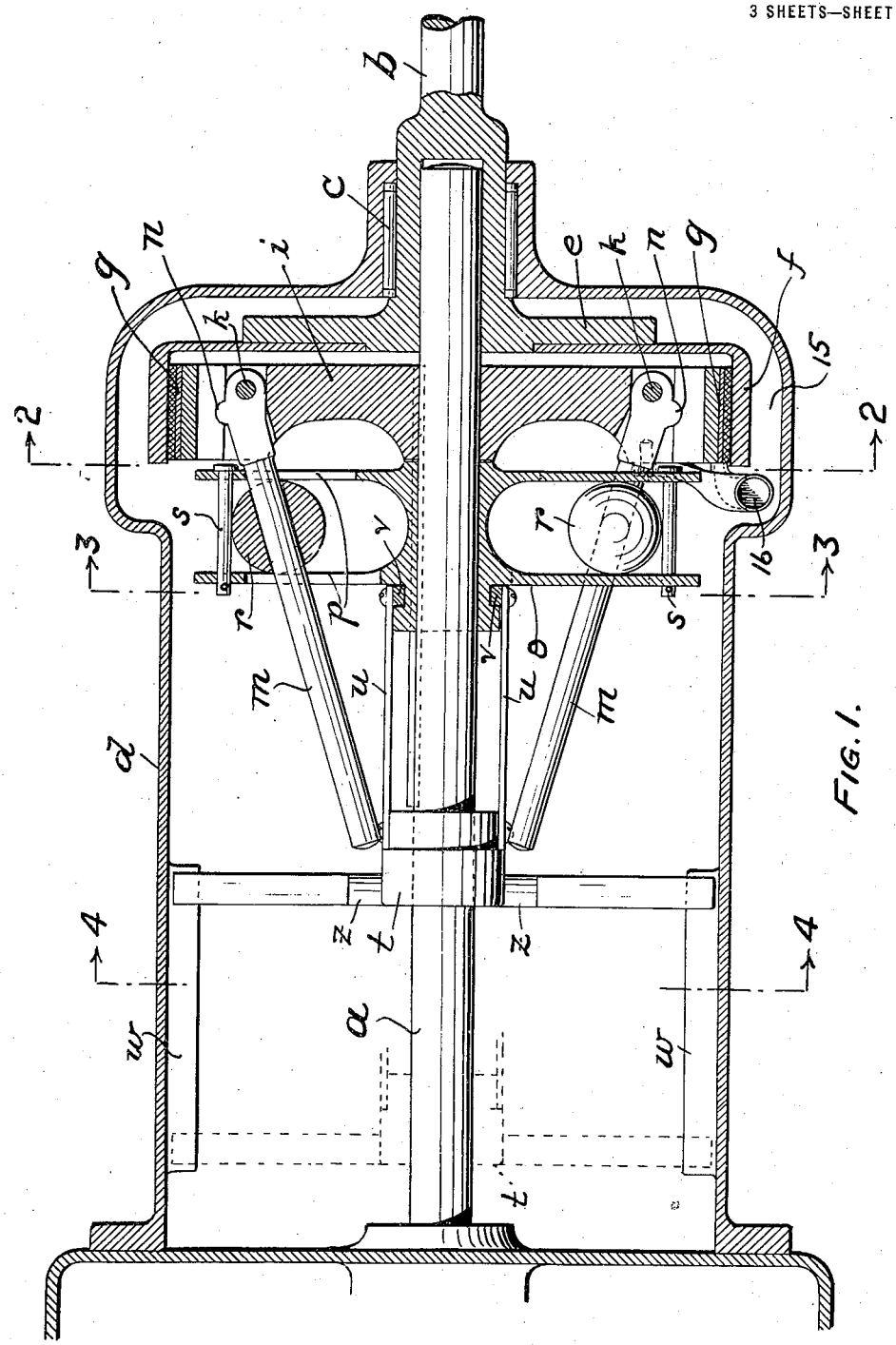
Figure 1 is a longitudinal sectional view of the driving and driven shafts and the intermediate frictional driving and speed changing mechanism.
Figure 3:
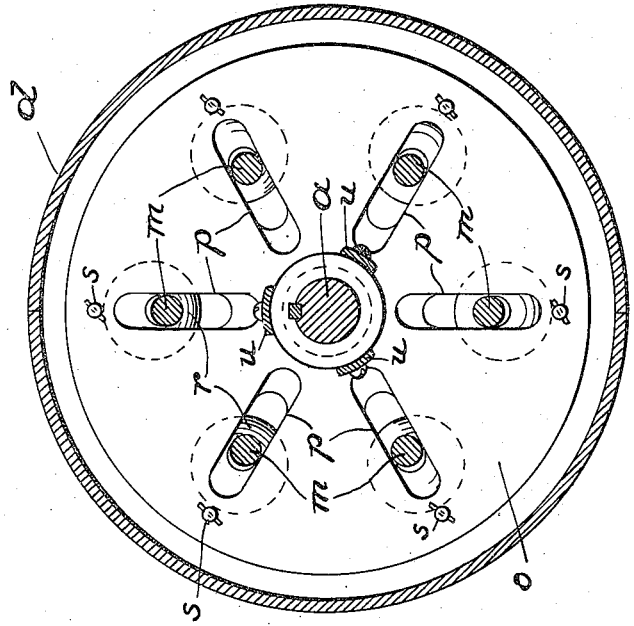
Fig. 3 is a cross-section on the line 3—3 of Fig. 1.

The shaft $a$ is part of, or is directly driven by, the crank shaft, and is hereinafter called the driving shaft. The propeller shaft $b$, which is connected with the reverse gear and back axle, and is hereinafter called the driven shaft, has its forward end sleeved on the rear end of the driving shaft and turns in a roller bearing $c$ carried by a casing $d$, which is part of, or is bolted directly to, the engine frame. The forward end of the driven shaft is shaped to form a disk $e$, to which is secured a drum $f$ having a forwardly extending annular flange the inner face of which is adapted to be engaged by friction shoes $g$, which are rotated by the driving shaft as hereinafter explained.

The friction shoes $g$, of which there are a number arranged at equal distances from the axis of the driving shaft $a$, are slidable radially in guides $h$, which are carried by a frame $i$ secured to the driving shaft $a$. The shoes are normally held in retracted position by means of radially extending tension springs $j$. The outer end of each spring is connected to one end of a shoe, while its inner end extends into a recess in the frame $i$ and is secured thereto.

Supported on the guides $h$ and extending in a tangential direction are shafts or pins $k$, one for each shoe, fulcrumed upon each of which is the rear end of a lever $m$. Just in advance of its fulcrumed end, each lever $m$ is provided with an outwardly extending projection $n$ having a convex face fitting into a concavely shaped recess in the corresponding shoe.

The shoes $g$ are forced into driving relation with the drum $f$ by the outward movement of the levers $m$, which movement is controlled by means hereinafter described.

Feathered on the driving shaft is a sliding carrier $o$, the same comprising side walls which are slotted at $p$ to permit the levers $m$ to extend therethrough and to swing on their pivots from and toward the driving shaft. Slidable on the levers $m$, and confined within the carrier $o$, are weights or balls r. These balls are movable radially within the carrier, their outward movement being restrained when the carrier is moved to the right or declutching position, by bars s.

Sleeved and slidable upon the driving shaft is a cross-head t, rearward from which extends a cylinder u carrying an annular projection v which enters a circumferential groove in a hub at the front of the carrier o. The cross-head is guided along slides w extending longitudinally on the inside of the casing d, which incloses the entire mechanism hereinbefore described.

It will thus be understood that while the carrier o revolves with the driving shaft, its longitudinal position on the shaft is determined by the longitudinal position of the cross-head t, which is manually operable, as hereinafter described. During the rotation of the driving shaft centrifugal force swings the balls r outward and therefore the levers m are swung more or less outward from the position shown, dependent upon the extent to which the cross-head t and carrier o are moved to the left. In the position shown, the shoes g are held by the springs j out of contact with the flange of the drum f, but as the cross-head t and carrier o are moved to the left, assuming the driving shaft to be rotating, the levers m will move the shoes g radially outward and press them against the flange of the drum f with sufficient force to establish a driving connection between the shoes and the drum. The extent of slippage between the shoes and the drum will vary inversely with the extent to which the carrier o is moved to the left. It is clear that it is within the option of the constructor to determine the gripping power between the friction elements when the carrier is moved to the extreme left. When the invention is applied to gas-driven automobiles, it will be preferable to so adjust the gripping power of the friction elements that when the carrier has been moved to the extreme left, and the engine is throttled to propel the car at a relatively low speed, the weights will assume their outermost position and there will be no slip between the friction elements, the driving connection being, in effect, a positive one, and greater speed being secured, as in the ordinary automobile, by increasing the driving power of the engine. In the event of a sudden increase of load, as in climbing a steep hill, the degree of frictional contact between the driven elements may allow a limited slippage, but it may be preferred to have the frictional grip so strong in this position as to make it necessary, as in the ordinary car, to adjust the speed relations between the engine and the propelling shaft. This is done by moving the carrier o more or less to the right, thereby permitting slippage and controlling the extent of the slippage, and consequently the extent of the reduction of the speed relation, until the load drops to normal, whereupon the carrier will again be moved to the left and the normal condition of a positive drive restored.

Manual adjustment of the cross-head t may be effected in any convenient way. I have shown, for this purpose, a rock-shaft x carrying an arm y, each forked end of which is forked to embrace a pin z on the cross-head t. A spring 10 normally swings the arm y to the left, as shown by the dotted lines in Fig. 5, thereby holding the cross-head t and carrier o in the full speed operative position; but by means of a foot-lever 11, secured to the shaft x, the shaft x may be rocked and the arm y swung toward or to the solid line position shown in Fig. 5, whereby the cross-head t is moved correspondingly toward or to the solid line position shown in Fig. 1, moving the carrier o correspondingly.

The rock-shaft may also be operated by means of a hand-operated lever 12 secured to the shaft x. The lever 12 may have a pawl 13 adapted to engage a notched quadrant 14, whereby the parts may be held in any desired speed position.

Figure 2:
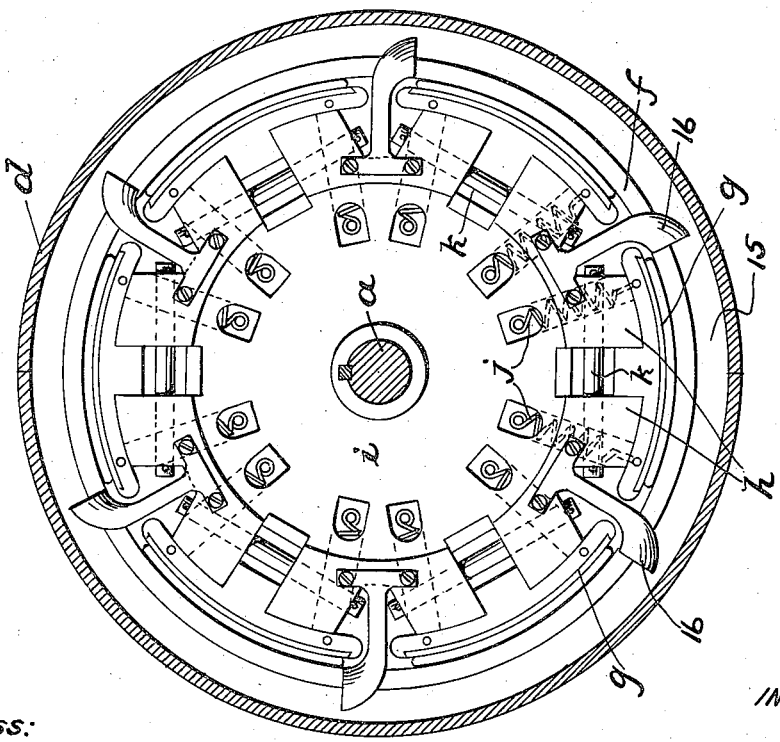
Fig. 2 is a cross-section on the line 2—2 of Fig. 1.

To maintain the friction surfaces of the shoes and drum well oiled, the casing is enlarged in diameter outside the shoes, so as to provide a reservoir 15 for lubricating oil. Secured to the rotatable frame i are curved tubes 16. The flared inlet mouths of these tubes open within the chamber 16 in the direction of rotation of the driving shaft (see Figs. 1 and 2) so that, as they turn within the oil reservoir at the bottom of the casing, they scoop up the oil and discharge it from their outlet ends between adjacent shoes.

Having now fully described my invention, what I claim and desire to protect by Letters Patent is:

1. In a variable speed drive, the combination with a driving shaft and a driven shaft, of coacting friction elements turning with the respective shafts, centrifugally acting means operable by, and movable longitudinally of, the driving shaft and connected with one of said friction elements and adapted, in different longitudinal positions, to vary the degree of frictional engagement between said elements, and means to move said centrifugally acting means longitudinally of the driving shaft.

2. In a variable speed drive, the combination with a driving shaft and a driven shaft, of coacting friction elements turning with the respective shafts, a centrifugally acting contrivance adapted to swing toward and from the driving shaft and thereby press one of said friction elements with varying force against the other friction element, and means to variably limit the outward swinging movement of said device, thereby controlling the degree of frictional engagement between said elements.

3. In a variable speed drive, the combination with a driving shaft and a driven shaft, of coacting friction elements turning with the respective shafts, a device adapted to swing toward and from the shaft and thereby press one of said friction elements with varying force against the other friction element, centrifugally acting means connected with and operating said device, and means independent of centrifugal force to move said centrifugally acting means into positions adapted, when said centrifugal force is operative, to vary the swinging movement of said device and thereby vary the degree of frictional engagement between said elements.

4. In a variable speed drive, the combination with a driving shaft and a driven shaft, of coacting friction elements turning with the respective shafts, a device turning with, and extending along the axis of, the driving shaft and adapted to swing toward and from the driving shaft and thereby press one of said friction elements with varying force against the other friction element, centrifugally acting means operable by the driving shaft, manually controlled means to move the centrifugally acting means in the direction of the axis of the driving shaft, and means to limit the radial movement of the centrifugally acting means so as to maintain it when operative at a uniform distance from the axis of the driving shaft, the centrifugally acting means being slidably connected with said device whereby the centrifugally acting means, in its longitudinal movement, in one direction or the other, swings said device toward or from the driving shaft to vary the degree of frictional engagement between said elements.

5. In a variable speed drive, the combination with a driving shaft and a driven shaft, of coacting friction elements turning with the respective shafts, a pivoted lever extending along, and turning with, the driving shaft and adapted to swing toward and from the driving shaft and thereby press one of said friction elements with varying force against the other friction element, a carrier turning with, and movable longitudinally, of the driving shaft, and a weight sleeved on the lever and radially movable upon the carrier under the action of centrifugal force.

6. In a variable speed drive, the combination with a driving shaft and a driven shaft, of a friction drum turning with the driven shaft, a friction shoe turning with the driving shaft, a pivoted lever turning with the driving shaft and connected with the shoe and adapted to press it against the drum with a force varying with the angular position of the lever, a carrier turning with and movable longitudinally of the driving shaft, and a weight sleeved on the lever and radially movable upon the carrier under the action of centrifugal force.

7. In a variable speed drive, the combination with a driving shaft and a driven shaft, of a friction drum turning with the driven shaft, a friction shoe turning with the driving shaft, a pivoted lever turning with the driving shaft and connected with the shoe and adapted to press it against the drum with a force varying with the angular position of the lever, a carrier turning with and movable along the driving shaft, a weight sleeved on the lever and radially movable upon the carrier under the action of centrifugal force, a casing, a cross-head sleeved on the shaft and guided on the casing, means connecting the cross-head and the carrier, and manually controlled means to slide the cross-head along the shaft.

8. In a variable speed drive, the combination with a driving shaft and a driven shaft, of a friction drum turning with the driven shaft, a friction shoe turning with the driving shaft and movable radially thereof, a spring tending to retract the shoe from the drum, centrifugally acting means tending to move the shoe into driving relation with the drum, and manually controlled means to vary the power of the centrifugally acting means and thereby vary the degree of frictional engagement between the drum and shoe.

In testimony of which invention, I have hereunto set my hand, at Philadelphia, Pa., on this 26th day of February, 1918.

FISHER H. LIPPPINCOTT.